United States Patent [19]
Pham et al.

[11] Patent Number: 5,825,145
[45] Date of Patent: Oct. 20, 1998

[54] QUIET COMMUTATION CIRCUIT FOR AN ELECTRIC MOTOR

[75] Inventors: Giao M. Pham, Milpitas; James H. Nguyen, San Jose, both of Calif.

[73] Assignee: Siliconix incorporated, Santa Clara, Calif.

[21] Appl. No.: 573,802

[22] Filed: Dec. 18, 1995

[51] Int. Cl.[6] .................................................. H02P 1/18
[52] U.S. Cl. .......................................... 318/439; 318/254
[58] Field of Search ..................................... 318/138, 134, 318/254, 439; 388/806, 823, 833

[56] References Cited

U.S. PATENT DOCUMENTS

| | | | |
|---|---|---|---|
| 4,250,435 | 2/1981 | Alley et al. | 318/138 |
| 4,275,343 | 6/1981 | Fulton et al. | 318/721 |
| 4,394,610 | 7/1983 | Dolland | 318/803 |
| 4,401,934 | 8/1983 | Dolland et al. | 318/798 |
| 4,455,513 | 6/1984 | Fulton et al. | 318/138 |
| 4,494,058 | 1/1985 | Berti | 318/254 |
| 4,513,230 | 4/1985 | Erdman | 318/254 |
| 4,540,906 | 9/1985 | Blom | 310/67 R |
| 4,558,265 | 12/1985 | Weischedel | 318/138 |
| 4,575,652 | 3/1986 | Gogue | 310/49 R |
| 4,642,537 | 2/1987 | Young | 318/254 |
| 4,656,400 | 4/1987 | Pailthorp et al. | 318/135 |
| 4,665,348 | 5/1987 | Stupak, Jr. | 318/135 |
| 4,673,849 | 6/1987 | Sears et al. | 318/272 |
| 4,743,815 | 5/1988 | Gee et al. | 318/254 |
| 4,751,459 | 6/1988 | Stupak, Jr. | 324/164 |
| 4,757,241 | 7/1988 | Young | 318/254 |
| 4,774,428 | 9/1988 | Konecny | 310/198 |
| 4,978,895 | 12/1990 | Schwartz | 318/254 |
| 5,015,939 | 5/1991 | Konecny | 318/701 |
| 5,034,668 | 7/1991 | Bausch | 318/254 |
| 5,237,247 | 8/1993 | Naito | 318/439 |
| 5,258,695 | 11/1993 | Utenick et al. | 318/138 |
| 5,272,803 | 12/1993 | Harrison et al. | 29/596 |
| 5,493,189 | 2/1996 | Ling et al. | 318/439 |
| 5,557,180 | 9/1996 | Cameron | 318/254 |

FOREIGN PATENT DOCUMENTS

| | | |
|---|---|---|
| 0 653 833 | 5/1995 | European Pat. Off. . |
| 2 281 459 | 3/1995 | United Kingdom . |

OTHER PUBLICATIONS

"Brushless DC Motor Drive Circuit", Development Data TDA5140, Philips, Jan. 1989.

Primary Examiner—John W. Cabeca
Attorney, Agent, or Firm—Skjerven, Morrill, MacPherson, Franklin & Friel; David E. Steuber

[57] ABSTRACT

A commutation control circuit for a conventional brushless DC motor. The circuit reduces power supply noise normally induced when current is switched from one pair of motor windings to the next. The motor conventionally includes a number of windings, each of which includes a terminal connected to a common center tap. The commutation circuit includes a first voltage-controlled current switch that is connected to the second terminal of a first one of the windings to control current through the first winding. Similarly, the second terminal of a second on of the windings is connected to a second voltage-controlled current switch. When a commutation is initiated to switch the current flow from the first to the second winding, the commutation circuit turns the second voltage-controlled switch fully on to quickly increase the current level through the second winding. A feedback network then monitors the current through the second winding and controls the current through the first winding via the first voltage-controlled switch so that the current through the first winding decreases at the same rate that the current through the second winding increases. Once the current through the first winding is approximately zero, the output of the feedback circuit is switched to the control terminal of the second current switch.

10 Claims, 8 Drawing Sheets

COMMUTATION SEQUENCER DECODE TABLE

| State | MBB | PWM | HSA | HSB | HSC | LSA | LSB | LSC | EMFA | EMFB | EMFC | RE |
|---|---|---|---|---|---|---|---|---|---|---|---|---|
| Reset | X | X | 0 | 0 | 0 | 0 | 0 | 0 | 0 | 0 | 1 | 0 |
| AB | 0 | 0 | 1 | 0 | 0 | 0 | 1 | 0 | 0 | 0 | 1 | 0 |
| AC | 0 | 0 | 1 | 0 | 0 | 0 | 0 | 1 | 0 | 1 | 0 | 1 |
| BC | 0 | 0 | 0 | 1 | 0 | 0 | 0 | 1 | 1 | 0 | 0 | 0 |
| BA | 0 | 0 | 0 | 1 | 0 | 1 | 0 | 0 | 0 | 0 | 1 | 1 |
| CA | 0 | 0 | 0 | 0 | 1 | 1 | 0 | 0 | 0 | 1 | 0 | 0 |
| CB | 0 | 0 | 0 | 0 | 1 | 0 | 1 | 0 | 1 | 0 | 0 | 1 |
| AB | 0 | 1 | 1 | 0 | 0 | 0 | 0 | 0 | 0 | 0 | 1 | 0 |
| AC | 0 | 1 | 1 | 0 | 0 | 0 | 0 | 0 | 0 | 1 | 0 | 1 |
| BC | 0 | 1 | 0 | 1 | 0 | 0 | 0 | 0 | 1 | 0 | 0 | 0 |
| BA | 0 | 1 | 0 | 1 | 0 | 0 | 0 | 0 | 0 | 0 | 1 | 1 |
| CA | 0 | 1 | 0 | 0 | 1 | 0 | 0 | 0 | 0 | 1 | 0 | 0 |
| CB | 0 | 1 | 0 | 0 | 1 | 0 | 0 | 0 | 1 | 0 | 0 | 1 |
| AB | 1 | 0 | 1 | 0 | 1 | 0 | 1 | 0 | 0 | 0 | 1 | 0 |
| AC | 1 | 0 | 1 | 0 | 0 | 0 | 1 | 1 | 0 | 1 | 0 | 1 |
| BC | 1 | 0 | 1 | 1 | 0 | 0 | 0 | 1 | 1 | 0 | 0 | 0 |
| BA | 1 | 0 | 0 | 1 | 0 | 1 | 0 | 1 | 0 | 0 | 1 | 1 |
| CA | 1 | 0 | 0 | 1 | 1 | 1 | 0 | 0 | 0 | 1 | 0 | 0 |
| CB | 1 | 0 | 0 | 0 | 1 | 1 | 1 | 0 | 1 | 0 | 0 | 1 |
| AB | 1 | 1 | 1 | 0 | 0 | 0 | 1 | 0 | 0 | 0 | 1 | 0 |
| AC | 1 | 1 | 1 | 0 | 0 | 0 | 0 | 1 | 0 | 1 | 0 | 1 |
| BC | 1 | 1 | 0 | 1 | 0 | 0 | 0 | 1 | 1 | 0 | 0 | 0 |
| BA | 1 | 1 | 0 | 1 | 0 | 1 | 0 | 0 | 0 | 0 | 1 | 1 |
| CA | 1 | 1 | 0 | 0 | 1 | 1 | 0 | 0 | 0 | 1 | 0 | 0 |
| CB | 1 | 1 | 0 | 0 | 1 | 0 | 1 | 0 | 1 | 0 | 0 | 1 |

*FIG. 7*

QUIET COMMUTATION CIRCUIT FOR AN ELECTRIC MOTOR

BACKGROUND

1. Field of the Invention

This invention relates generally to commutation circuits for electric motors.

2. Description of Related Technology

FIG. 1 is a schematic diagram of a conventional commutation sequencer 18 connected to conventional motor and drive circuitry 7, which includes a portion of a three-phase brushless spin motor 10 connected to a motor driver 20. For the example illustrated herein, spin motor 10 is assumed to include three sets of phase windings, each of which is selectively driven at a predetermined phase. In FIG. 1, the three sets of windings are represented by phase windings 12, 14, and 16, which are arranged around a rotor shaft (not shown) and have a common connection at a center tap 11. As known to those skilled in the art, sequencer 18 and a motor driver 20 collectively operate to selectively drive pairs of phase windings 12, 14, and 16 to induce rotation of the rotor shaft of motor 10. Diodes $D_1$–$D_6$ protect motor and drive circuitry 7 from extreme voltages on nodes A, B, and C that would otherwise result, as explained below, due to the inductances of windings 12, 14, and 16.

FIG. 2 is a set of traces illustrating motor torque with respect to motor electrical degrees. To spin a rotor shaft of a motor continuously in one direction, the motor torque should be either continuously positive or continuously negative. A continuously positive motor torque, for example, can be provided by designing and controlling sequencer 18 and motor driver 20 to transfer current to selected pairs of windings in a predetermined and precisely timed sequence so that the overall torque curve of the motor is defined along the extremum segments connecting points a1–a7 of FIG. 2. The act of transferring current from one pair of windings to the next is conventionally called "commutation."

Referring back to FIG. 1, transistors 20a, 20c, and 20e are used to connect their respective windings to the positive voltage terminal V+; such transistors are known in motor lexicon as "highside" transistors. Conversely, transistors 20b, 20d, and 20f are used to connect their respective windings to the relatively low ground potential, and so are referred to as "lowside" transistors. Using this labeling convention, the line used to drive the highside transistor 20a for phase A is labeled HSA for "highside A." Similarly, the line used to drive the lowside transistor 20b for phase A is labeled LSA for "lowside A." The highside and lowside drive lines for phases B and C are similarly labeled HSB and LSB, and HSC and LSC, respectively.

Let us assume that highside A transistor 20a and lowside B transistor 20d are on so that windings 12 and 14 are conducting current (i.e., the motor is within phase AB). To commutate motor 10 from phase AB to phase AC, transistor 20d is turned off and transistor 20f is turned on. Because windings are inherently inductive, windings 14 and 16 resist changes in current. Thus, when transistor 20d is abruptly turned off, the current through winding 14 (phase B) is forced back toward the power supply V+ through a diode $D_3$, and when transistor 20f is turned on, the current through winding 16 (phase C) will, for an instant, remain zero. If diode $D_3$ were not provided, the voltage level on terminal B would rise to some extreme positive value, likely damaging motor and drive circuitry 7. Diodes $D_1$ and $D_6$ similarly protect nodes A and C from extreme positive voltage levels, while diodes $D_2$, $D_4$, and $D_5$ protect nodes A, B, and C, respectively, from extreme negative voltage levels.

Back electromotive force (BEMF) induced in winding 14 by the movement of the rotor shaft increases the voltage drop across winding 14, thus speeding the decline of the current through winding 14. Conversely, BEMF induced in winding 16 decreases the voltage drop across winding 16, thus slowing the rate of increase in current through winding 16. Because the current through winding 14 diminishes more quickly than the current through winding 16 increases, the current from the power supply V+ through winding 12 (i.e., $I_B+I_C$) is not constant during the period of transition from winding 14 to winding 16. Furthermore, the resultant periodic fluctuations in power supply and winding currents can cause electro-acoustic effects in power supply and motor structures, as evidenced by an annoying audible hum. The power-supply-current fluctuations may be diminished through the use of high-performance power supplies, but upgraded power supplies add considerable weight and expense. Moreover, high-performance power supplies do little to solve the problem of fluctuations in winding currents. Accordingly, Applicant recognized a need to reduce or eliminate undesirable electro-acoustic effects without the additional weight and expense of a more robust power supply.

SUMMARY

The present invention addresses the aforementioned need by providing a commutation circuit that minimizes changes in current loading and the associated noise. To accomplish this, a commutation control circuit includes an inventive sequencer and associated circuitry that maintain a relatively constant supply current.

To commutate from a first to a second winding, the sequencer turns the second winding fully on while maintaining control of the first winding. As the current through the second winding ramps up, a current sensor senses the increasing current through the second winding and controls the current through the first winding so that the current through the first winding decreases at the same rate that the current through the second winding increases. In this way, the total current through both windings remains substantially constant during the commutation period. Commutation is complete when all of the current is conducted through the second winding, after which the sequencer switches control over to the second winding.

Maintaining a constant total current during the commutation period minimizes the periodic changes in supply current loading that were described above as a source of undesirable electrical and audible noise. Hence, the inventive commutation circuit advantageously diminishes this undesirable noise, and does so without the additional weight and expense of a more robust power supply.

BRIEF DESCRIPTION OF THE FIGURES

These and other features, aspects, and advantages of the present invention will become understood with regard to the following description, appended claims, and accompanying drawings, where:

FIG. 7 is a decode table that describes the outputs of commutation sequencer 41 with respect to the various possible phases and inputs.

DETAILED DESCRIPTION

Figure 1:
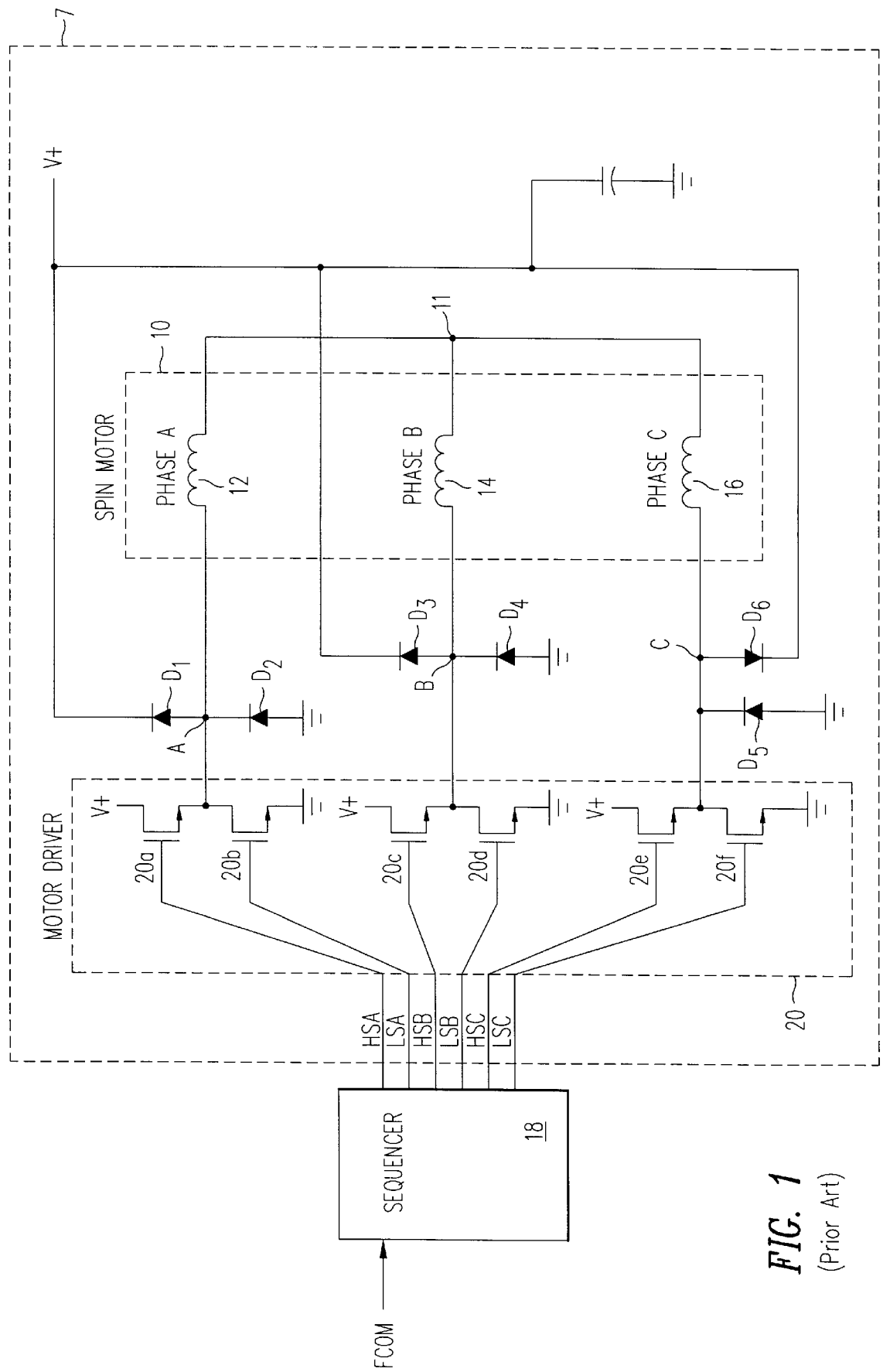
FIG. 1 is a schematic diagram of a conventional commutation sequencer 18 connected to conventional motor and drive circuitry 7.
Figure 2:
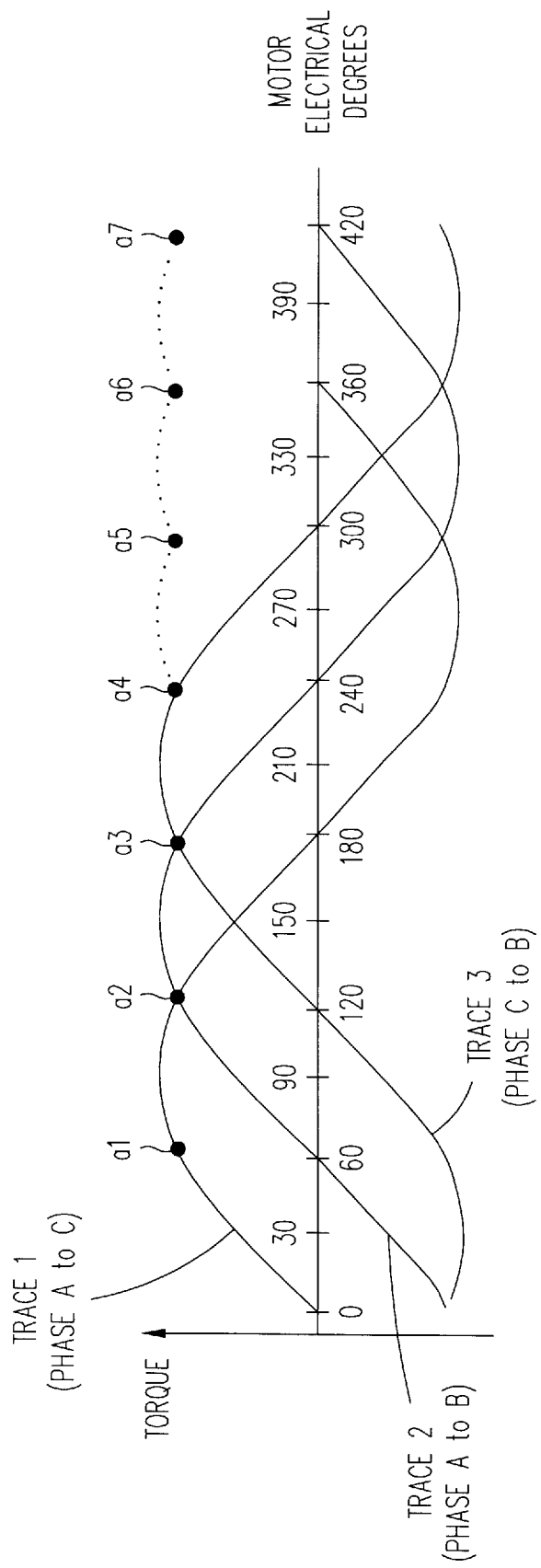
FIG. 2 is a set of traces illustrating motor torque with respect to motor electrical degrees.
Figure 3:
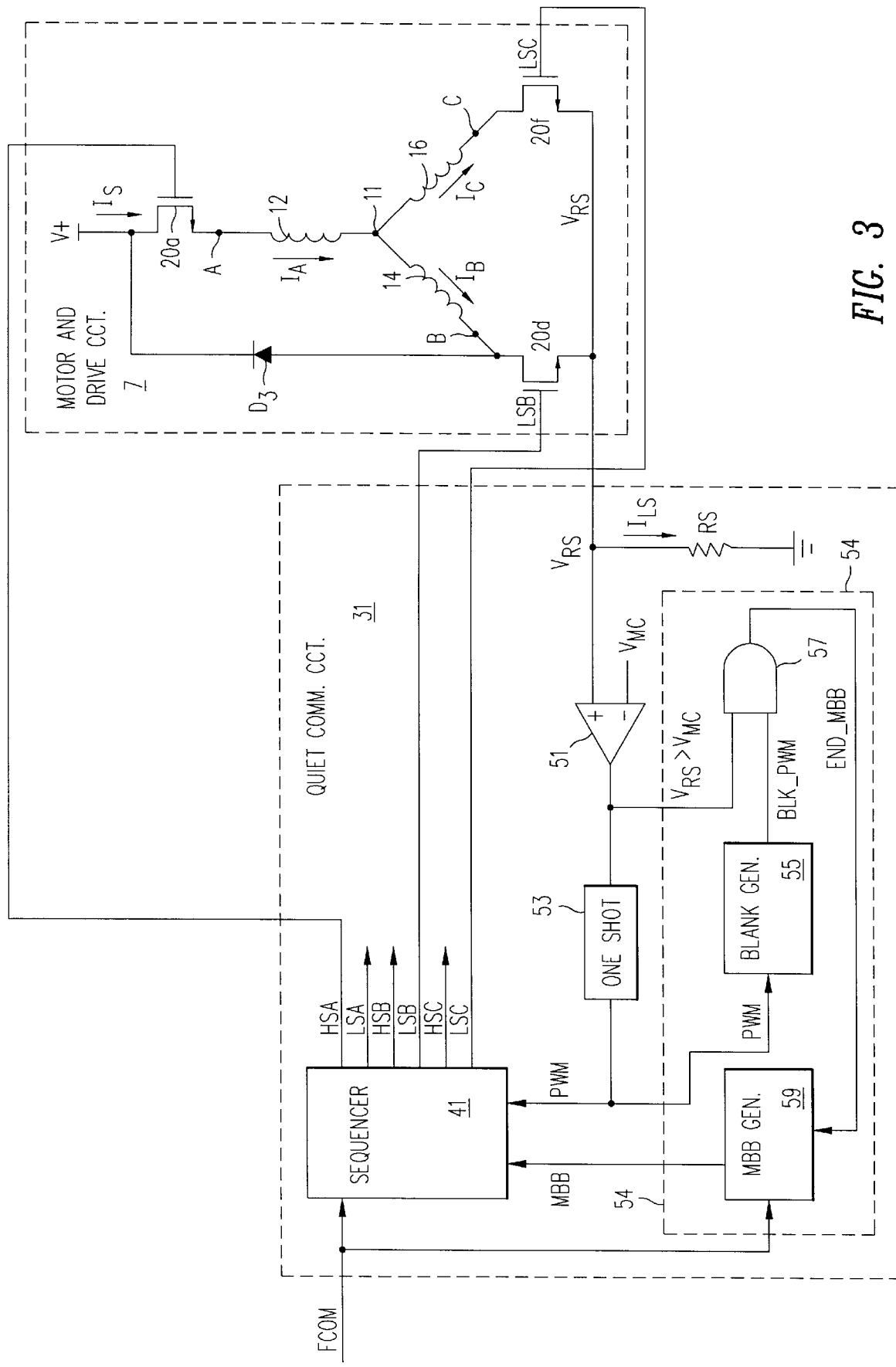
FIG. 3 shows conventional motor and drive circuit 7 connected to a quiet commutation circuit 31 in accordance with an embodiment of the invention.

FIG. 3 shows conventional motor and drive circuit 7 connected to a quiet commutation circuit 31 in accordance with an embodiment of the invention. Motor and drive circuit 7 is the same as that described above in connection with FIG. 1; however, various of the components have been rearranged or omitted to simplify the following description.

Quiet commutation circuit 31 includes a commutation sequencer 41, a sense resistor RS, a comparator 51, a one-shot 53, and a make-before-break circuit 54. Make-before-break circuit 54 in turn includes a blanking generator 55, an AND gate 57, and a make-before-break generator 59. Sequencer 41, like sequencer 18 of FIG. 1, operates to selectively drive pairs of phase windings 12, 14, and 16 using high- and lowside drive lines HSA, LSA, HSB, LSB, HSC, and LSC.

Figure 4:
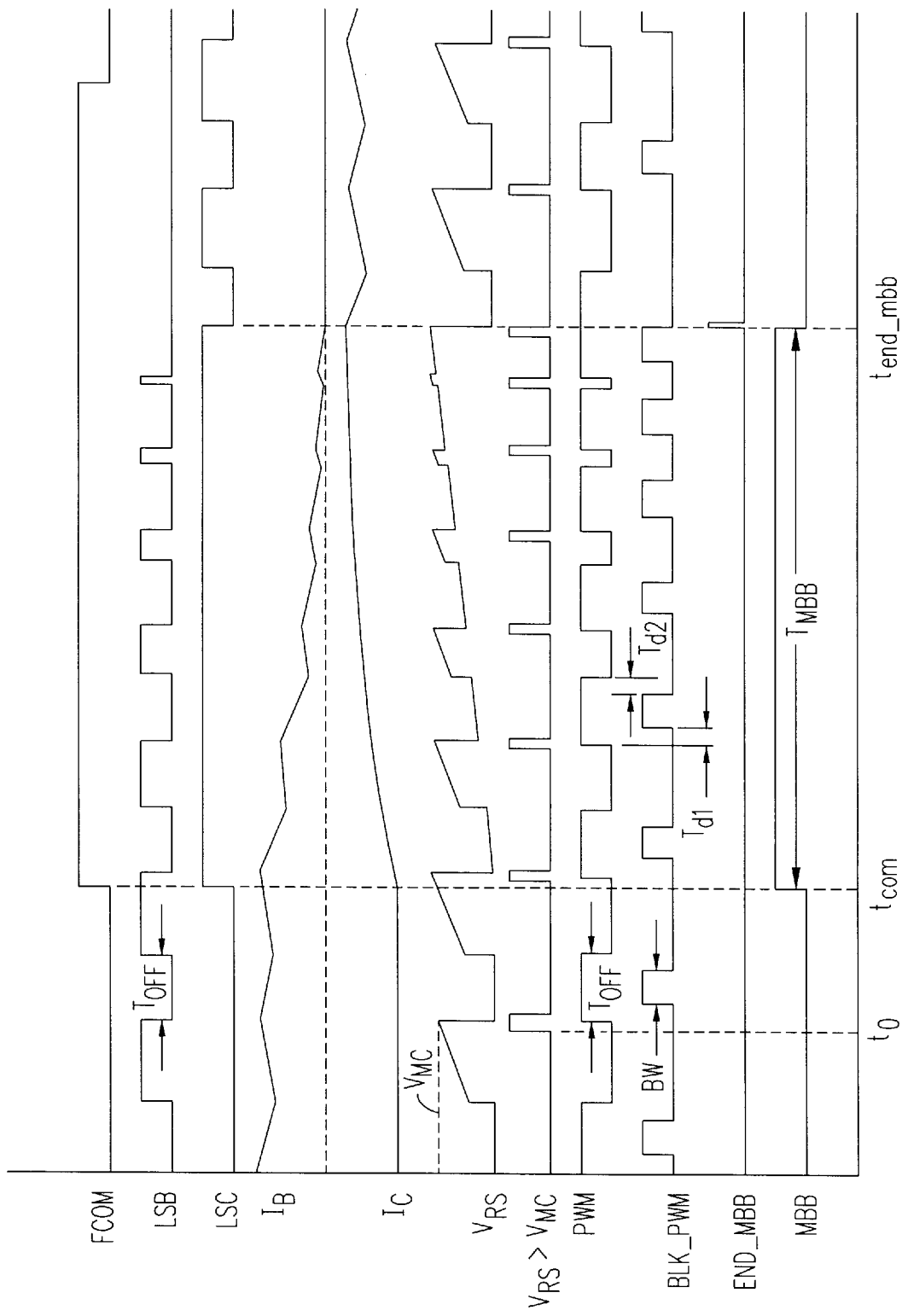
FIG. 4 shows various waveforms corresponding to like-named terminals depicted in FIG. 3.

FIG. 3, in conjunction with FIG. 4, is used to explain the concept of "lowside commutation," so called because current is switched from one lowside transistor to the next. For simplicity, FIG. 3 includes only those components necessary to explain a lowside commutation from phase AB to phase AC. For example, transistors 20a, 20d, and 20f are the highside A, lowside B, and lowside C transistors, respectively. (The concept of "highside commutation," in which current is switched from one highside transistor to the next, is explained below in connection with FIG. 5.)

Current passing through any of the lowside transistors, including the illustrated lowside transistors 20d or 20f of FIG. 3, must also pass through sense resistor RS. Thus, sense resistor RS develops a voltage on terminal $V_{RS}$ that is proportional to the total lowside current $I_{LS}$ through the lowside of motor and drive circuit 7.

The voltage developed across sense resistor RS is provided to the non-inverting terminal (+) of comparator 51. The inverting terminal (−) of comparator 51 is connected to a motor-control terminal $V_{MC}$, upon which is provided an externally-supplied motor control voltage that establishes the level of current through, (and consequently the speed of) spin motor 10 of motor and drive circuit 7.

The output of comparator 51 is connected to the input of one-shot 53 and to one input of AND gate 57. The output of one-shot 53 is provided to input terminals of both sequencer 41 and blanking generator 55 via a line PWM. The output of blanking generator 55 is connected to a second input of AND gate 57. Finally, the output of AND gate 57 is connected to an input of make-before-break generator 59.

The operation of quiet commutation circuit 31 is explained below in connection with FIG. 4, which includes various waveforms corresponding to like-named terminals depicted in FIG. 3.

Referring to motor and drive circuitry 7, assume that the motor is in phase AB so that windings 12 and 14 are conducting. When transistor 20d is turned on, the current through sense resistor RS increases until the voltage on terminal $V_{RS}$ exceeds the motor control voltage on terminal $V_{MC}$. At that instant (time $t_0$ of FIG. 4) comparator 51 outputs a logic one (e.g., five volts) on terminal $V_{RS} > V_{MC}$ to the input of one-shot 53. In response, one-shot 53 outputs a logic one (e.g., five volts) on line PWM for e.g. 12 microseconds. The logic one on line PWM causes sequencer 41 to output a logic zero on line LSB, shutting off transistor 20d. Transistor 20d remains off until the signal on line PWM (i.e., the output of one-shot 53) returns to a logic zero. In one embodiment, the duration of the "off time" $T_{off}$ is programmable from 3 to 12 microseconds.

During the time that transistor 20d is off, the voltage on terminal $V_{RS}$ is pulled to ground through sense resistor RS. Because of the inherent inductance of winding 14, the current $I_B$ does not cease during the off time $T_{off}$. Instead, the current $I_B$ gradually decreases as it is forced through diode $D_3$ back toward the power supply. Next, at the end of the off time $T_{off}$, the signal on line PWM returns to a logic zero, causing sequencer 41 to change state and again turn on transistor 20d.

Because the current $I_B$ will have decreased during the preceding off time $T_{off}$, the voltage on terminal $V_{RS}$ will immediately rise to a level less than the motor control voltage on terminal $V_{MC}$ when transistor 20b begins conducting once again. The current $I_B$ will then increase once again until the voltage on terminal $V_{RS}$ rises above the control voltage $V_{MC}$, initiating the next off time $T_{off}$. Thus, quiet commutation circuit 31 sequentially provides a pulse-width-modulated (PWM) signal to transistor 20d via line LSB.

The type of PWM used in the present example is conventionally called "fixed off-time" PWM because the off time, which is established by one-shot 53, is the fixed time period $T_{off}$. To increase the current $I_S$, and therefore the speed of the motor 10, the voltage on control terminal $V_{MC}$ is adjusted upward. Such an adjustment increases the on-time of e.g. transistor 20d relative to the fixed off time $T_{off}$, thus increasing the average current through the active windings.

When motor and drive circuitry 7 receives an FCOM pulse on line FCOM, the motor 10 must be commutated to the next phase. That is, the supply current $I_S$ must be re-routed to pass through the next pair of windings to be driven. In the foregoing example, motor and drive circuitry 7 was described in phase AB, in which windings 12 and 14 are the active pair of windings. The following example describes the commutation to phase AC, in which windings 12 and 16 become the active pair; that is, the highside remains highside A while the lowside is switched from lowside B to lowside C.

The lowside commutation from phase AB to phase AC begins at the leading edge of an FCOM pulse, as shown as time $t_{com}$ in FIG. 4. Sequencer 41 responds to the FCOM pulse by providing a logic one on line LSC, thereby turning transistor 20f fully on. Thus, the current $I_C$ through lowside C winding 16 begins to increase at time $t_{com}$.

As the current $I_C$ increases, the voltage drop across sense resistor RS, and consequently the voltage on terminal $V_{RS}$, will increase due to the additional current. For this reason, the on-time of transistor 20d, as determined by the time required for the voltage on terminal $V_{RS}$ to exceed the motor control voltage on terminal $V_{MC}$, will decrease as the current $I_C$ increases. And, because of the feedback provided by sense resistor RS, the current through lowside B (transistor 20d and winding 14) will be forced to decrease at a rate that is established by the rate of increase of the current $I_C$ through lowside C (transistor 20f and winding 16). As explained in more detail below, the commutation from phase AB to phase AC is complete when the current $I_C$, by itself, develops a voltage on terminal $V_{RS}$ that exceeds the voltage on terminal $V_{MC}$.

The time during which the current $I_B$ is decreasing and the current $I_C$ is increasing is called the "make-before-break" period because a current path is "made" through phase C winding 16 before the current path is "broken" through phase B winding 14. As indicated above, the make-before-break period begins with the rising edge of an FCOM pulse and ends when the current $I_C$ by itself develops a voltage on terminal $V_{RS}$ that exceeds the voltage on terminal $V_{MC}$.

The purpose of make-before-break circuit 54 (e.g., generator 59, blanking generator 55, and AND gate 57, collectively) is to determine the length of the make-before-break period. Make-before-break generator 59 is a simple logic circuit that outputs a logic one on make-before-break line MBB upon receiving a positive-going transition on line FCOM and then returns to a logic zero upon receiving a positive-going transition on end-make-before-break line END_MBB. If the FCOM pulse returns to a logic zero before the end-make-before-break line END_MBB goes positive, make-before-break circuit 54 is configured to output a logic zero on make-before-break line MBB; thus, the duration of the make-before-break period $T_{MBB}$ is limited to the duration of the FCOM pulse.

To determine when the current $I_C$ by itself develops a voltage on terminal $V_{RS}$ that exceeds the voltage on terminal $V_{MC}$, the voltage on terminal $V_{RS}$ is compared to the voltage on terminal $V_{MC}$ when the pulse-width-modulated transistor 20d is off. To this end, AND gate 57 provides a logic one when the transistor 20d is off (i.e., the voltage on terminal PWM is a logic one) and the voltage on terminal $V_{RS}$ is greater than the control voltage on terminal $V_{MC}$ (as indicated by a logic one on terminal $V_{RS} > V_{MC}$). A logic one output from AND gate 57 on the end make-before-break line END_MBB triggers make-before-break generator 59 to output a logic zero to sequencer 41 on terminal MBB, indicating an end to the make-before-break period $T_{MBB}$. Sequencer 41 responds at time $t_{end\_mbb}$ by providing a logic zero on line LSB and providing the PWM signal to lowside-C transistor 20f, thereby switching control to transistor 20f.

Blanking generator 55 conventionally provides blanking windows BW within each off time $T_{off}$. Each time the voltage on terminal PWM transitions from logic zero to logic one, blanking generator 55 provides a logic one after a delay $t_{d1}$ and returns to a logic zero a time $t_{d2}$ before the end of the off period $T_{off}$. The blanking function of blanking generator 55 provides safety margins to ensure that the end of the make-before-break period $T_{MBB}$ is triggered within an off period $T_{off}$. In one embodiment, delay $t_{d1}$ and time $t_{d2}$ are programmable, allowing for the optimization of the blanking function.

Figure 5:
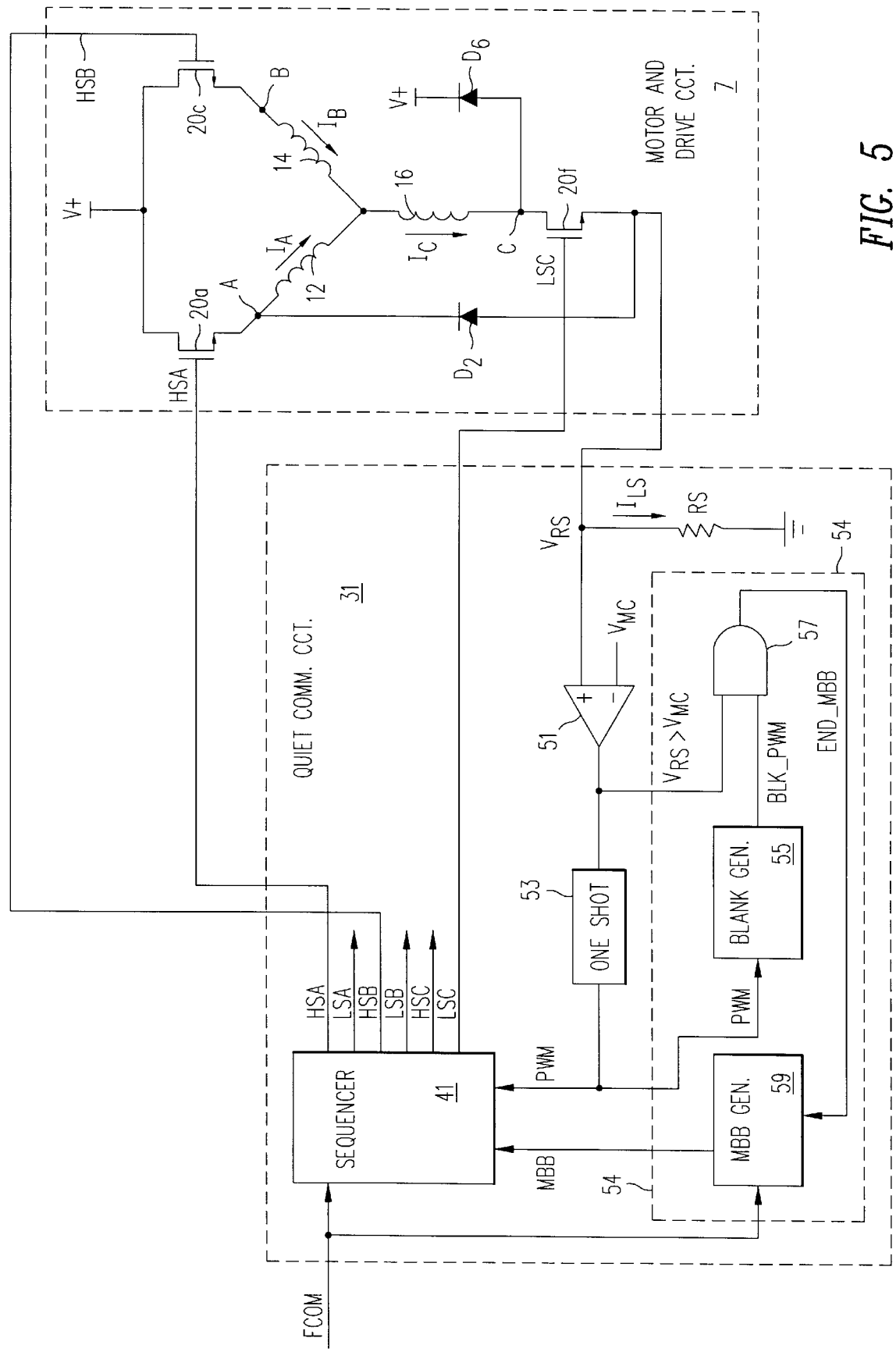
FIG. 5 shows conventional motor and drive circuit 7 connected to a quiet commutation circuit 31 in accordance with an embodiment of the invention.

FIG. 5 is a schematic diagram of quiet commutation circuit 31 connected to motor and drive circuit 7. The circuits of FIG. 5 are identical to those of FIG. 3; however, motor and drive circuitry 7 is shown to include only those components necessary to explain a highside commutation from phase AC to phase BC. For example, transistors 20a, 20c, and 20f are the highside A, highside B, and lowside C transistors, respectively.

Referring to motor and drive circuitry 7, assume that the motor is in phase AC so that current from supply terminal V+ is conducted through windings 12 and 16, in that order. When transistors 20a and 20f are both on, the current through sense resistor RS increases until the voltage on terminal $V_{RS}$ exceeds the control voltage on terminal $V_{MC}$. At that instant (time $t_0$ of FIG. 6) comparator 51 outputs a logic one (e.g., five volts) on terminal $V_{RS} > V_{MC}$ to the input of one-shot 53. In response, one-shot 53 outputs a logic one (e.g., five volts) on line PWM. The logic one on line PWM causes sequencer 41 to output a logic zero on line LSC, shutting off transistor 20f. Transistor 20f remains off until the output of one-shot 53 returns to a logic zero.

During the time that transistor 20f is off, the voltage on terminal $V_{RS}$ is pulled to ground through sense resistor RS. Because of the inherent inductances of windings 12 and 16, the current $I_C$ does not cease during the off time $T_{off}$. Instead, the current $I_C$ gradually decreases as it is forced through diode $D_6$ back toward the power supply. Next, at the end of the off time $T_{off}$, the signal on line PWM returns to a logic zero, causing sequencer 41 to change state and again turn on transistor 20f.

Because the current $I_C$ decreased during the preceding off time $T_{off}$, the voltage on terminal $V_{RS}$ will immediately rise to a level less than the control voltage on terminal $V_{MC}$ when transistor 20f begins conducting once again. The current $I_C$ will then increase once again until the voltage on terminal $V_{RS}$ rises above the control voltage on terminal $V_{MC}$ thus initiating the next off time $T_{off}$. In this way, quiet commutation circuit 31 sequentially provides a PWM signal to transistor 20f via line LSC.

When motor and drive circuitry 7 receives an FCOM pulse on line FCOM, the motor 10 must be commutated from phase AC to phase BC, in which windings 14 and 16 become the active pair; that is, the highside is switched from highside A to highside B, while the lowside remains lowside C. This process is conventionally known as "highside" commutation.

Figure 6:
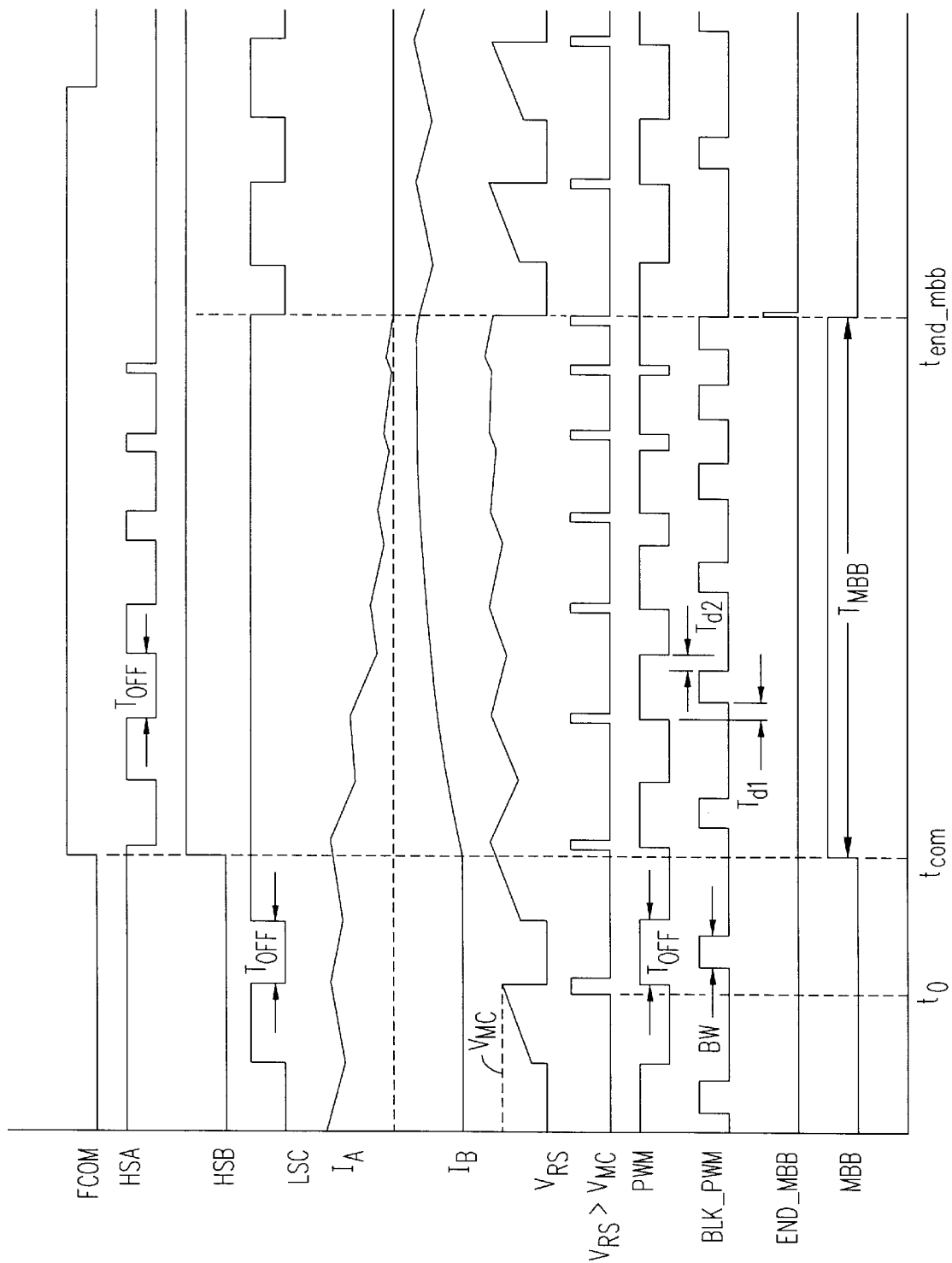
FIG. 6 shows various waveforms corresponding to like-named terminals depicted in FIG. 5.

The highside commutation from phase AC to phase BC begins at the leading edge of an FCOM pulse, as shown as time $t_{com}$ in FIG. 6. Sequencer 41 responds to the FCOM pulse by:

1. providing a logic one on line HSB, thereby turning transistor 20c on;

2. providing a logic one on line LSC, thereby turning transistor 20f fully on; and 3. switching the PWM current control signal from line LSC to line HSA.

With a logic one on line HSB, the current $I_B$ through highside B winding 14 will increase. And, as current $I_B$ increases, the voltage drop across sense resistor RS, and consequently the voltage on terminal $V_{RS}$, will increase due to the additional current through winding 16. For this reason, the on-time of transistor 20a, as determined by the time required for the voltage on terminal $V_{RS}$ to exceed the voltage on terminal $V_{MC}$, will decrease as the current $I_B$ increases. Furthermore, because of the feedback provided by sense resistor RS, the current through highside A (transistor 20a and winding 12) will be forced to decrease at a rate that is established by the rate of increase of the current $I_B$ through highside B (transistor 20c and winding 14).

The period during which the current $I_A$ is decreasing and the current $I_B$ is increasing (the make-before-break period) begins with the rising edge of an FCOM pulse and ends when the current $I_B$ by itself (through winding 16) develops a voltage on terminal $V_{RS}$ that exceeds the voltage on terminal $V_{MC}$. To determine when the current $I_B$ by itself develops a voltage on terminal $V_{RS}$ that exceeds the voltage on terminal $V_{MC}$, the voltage on terminal $V_{RS}$ is compared to the voltage on terminal $V_{MC}$ when the modulated transistor 20a is off. At such times, the contribution of phase-A winding 12 to the current $I_C$ through winding 16 will be conducted back to node A via diode $D_2$, and therefore will not contribute to the voltage on terminal $V_{RS}$.

AND gate 57 provides a logic one to make-before-break generator 59 when the transistor 20d is off (i.e., the voltage on terminal PWM is a logic one) and the voltage on terminal $V_{RS}$ is greater than the control voltage on terminal $V_{MC}$ (as indicated by a logic one on terminal $V_{RS}$>$V_{MC}$). A logic one output from AND gate 57 on the end-make-before-break line END_MBB triggers make-before-break generator 59 to output a logic zero to sequencer 41 on terminal MBB, indicating an end to the make-before-break period $T_{MBB}$.

Sequencer 41 responds at time $t_{end\_mbb}$ by:

1. providing a logic zero on line HSA, thereby turning transistor 20a off;

2. providing a logic one on line HSB, thereby turning transistor 20c fully on; and 3. switching the PWM current control signal from line HSA back to line LSC.

From time $t_{end\_mbb}$, sequencer 41 continues to control current through phase BC (windings 14 and 16) by modulating the signal on line LSC until the next commutation signal.

FIG. 7 is a decode table that describes the output levels of commutation sequencer 41 with respect to the various possible phases, or "states," and the input levels on lines MBB and PWM. The outputs EMFA, EMFB, EMFC, and RE are conventionally used to select the unpowered winding so that the back electromotive force (BEMF) of that unpowered winding may be used to establish the appropriate FCOM-pulse timing.

The truth table of FIG. 7 may be used in conjunction with conventional computer-aided design (CAD) software to provide the necessary circuitry to implement sequencer 41. An example of an appropriate CAD program is AutoLogic™ available from Mentor Graphics of Sunnyvale, Calif.

Figure 8:
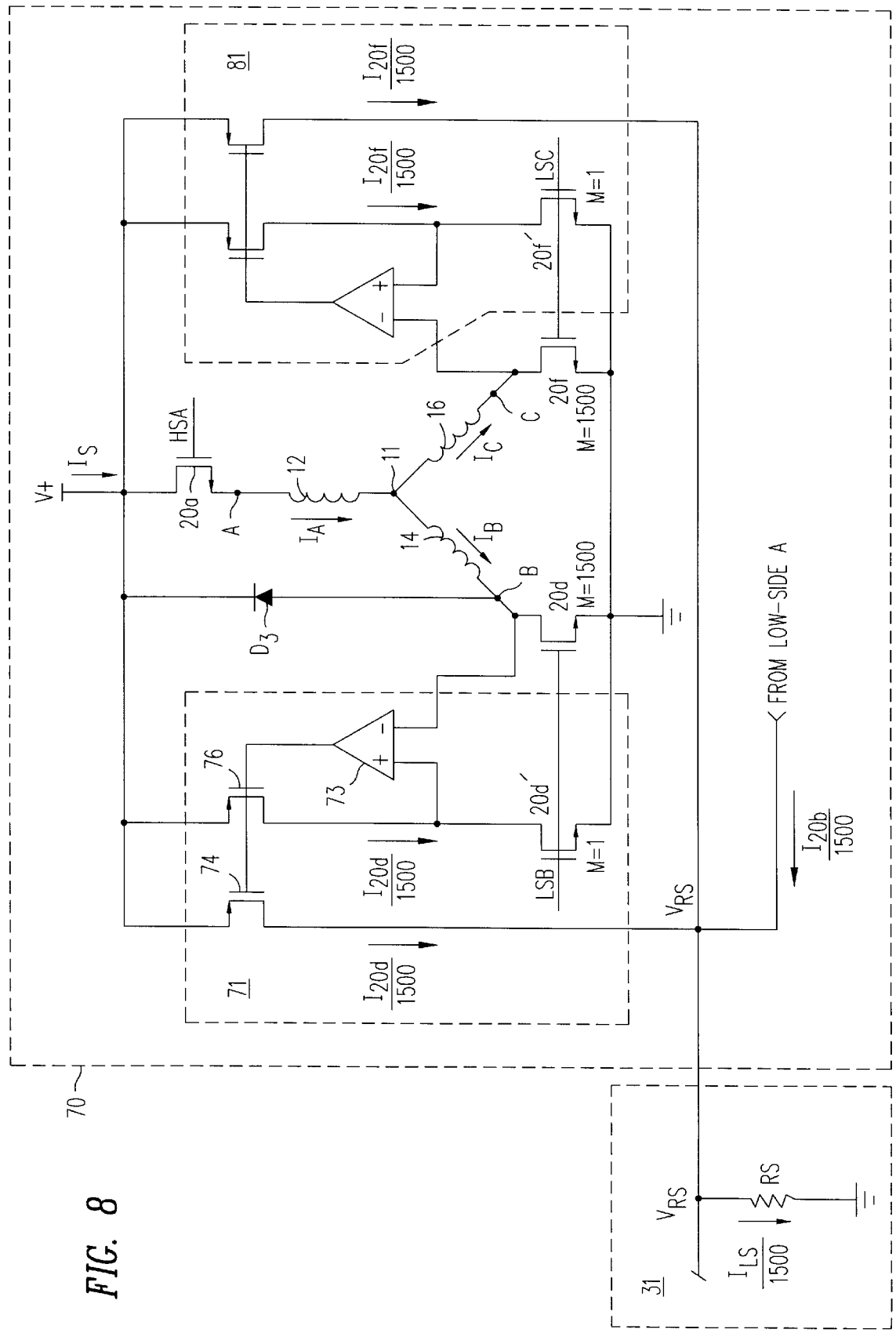
FIG. 8 is a motor and drive circuit 70 coupled to quiet commutation circuit 31 in accordance with another embodiment of the invention.

FIG. 8 is a motor and drive circuit 70 coupled to quiet commutation circuit 31 in accordance with another embodiment of the invention. Motor and drive circuit 70 is similar to motor and drive circuit 7 of FIGS. 3 and 5, like-numbered elements being the same for all three figures. However, the feedback network for developing the voltage on terminal $V_{RS}$ is modified for improved efficiency.

In addition to the components shown in FIGS. 3 and 5 for motor and drive circuit 7, motor and drive circuit 70 includes feedback circuits 71 and 81. And, while not shown, a third feedback circuit similar to feedback circuits 71 and 81 is provided for low-side A transistor 20b. Each of the feedback circuits operates in the manner described below in connection with feedback circuit 71.

Feedback circuit 71 includes a transistor 20d', an operational amplifier 73, and a conventional current mirror comprised of transistors 74 and 76. Operational amplifier 73 has its inverting and non-inverting input terminals connected to the drains of transistors 20d and 20d', respectively. By controlling the voltage on the control terminal of transistor 76, operational amplifier 73 maintains the same voltage on the respective drains of transistors 20d and 20d'.

Transistor 20d' is similar to low-side transistor 20d, except that low-side transistor 20d has a multiplication factor M of 1500, while transistor 20d' has a multiplication factor M of one. Thus, as transistors 20d and 20d' have substantially identical gate and drain voltages, the current through transistor 20d' is 1500 times less than the current conducted by low-side transistor 20d (i.e., $I_{20d'}=I_{20d}/1500$) The current $I_{20d}'$ through transistor 20d' is conventionally mirrored by transistors 74 and 76 so that a current of $I_{20d}/1500$ is conducted to sense resistor RS via terminal $V_{RS}$. Feedback circuit 81 similarly provides current $I_{20f}/1500$, and the third feedback circuit provides a current $I_{20b}/1500$, representing the current through low-side transistor 20b. Currents $I_{20b}/1500$, $I_{20d}/1500$, and $I_{20f}/1500$ are summed at terminal $V_{RS}$ so that a current $I_{LS}/1500$, equal to the total lowside current divided by 1500, passes through sense resistor RS to develop a feedback voltage on terminal $V_{RS}$.

Importantly, motor and drive circuit 7 of FIGS. 3 and 5 drives sense resistor RS with a current $I_{LS}$ that is 1500 times greater than the current $I_{LS}/1500$ provided to sense resistor RS by motor and drive circuit 70. Thus, motor and drive circuit 70 significantly reduces the amount of power dissipated by sense resistor RS, and thereby improves overall efficiency. Because of the reduced current through sense resistor RS, the value of sense resistor RS must be increased by a factor of 1500 if the voltage drop across sense resistor RS is to be maintained.

Commutation circuits in accordance with the present invention are not limited to the particular applications described above. For example, the pulse-width modulation used to control current through motor 10 could be implemented as constant-frequency PWM or constant-on-time PWM. In addition, a quiet-commutation circuit in accordance with the present invention may be used to decrease power-supply noise when an analog control signal, as opposed to a PWM signal, is used to control motor speed. When commutating from one winding to the next in such an embodiment, a feedback network may be configured to provide a control signal proportional to the total current through both windings to the transistor controlling the current through the first winding. The feedback network could then shut down the first winding at the rate established by the total current through both windings. Once the current through the first winding reached zero, the output of the feedback circuit could be switched to the control terminal of the second current switch. Therefore, the scope of the appended claims should not be limited to the description of the preferred versions described herein.

What is claimed is:

1. A commutation circuit for an electric motor, the electric motor including a first winding, a first current switch for controlling a first current level through the first winding, a second winding, and a second current switch for controlling a second current level through the second winding, the commutation circuit comprising:

an input node for receiving a commutation signal;

a sequencer having a first input terminal connected to the input node and having first and second output terminals connected to the first and second current switches, respectively, the sequencer for turning off the first current switch and turning on the second current switch in response to the commutation signal;

a control terminal for receiving a control signal, the control signal for establishing a rotational speed for the motor a current sensor for generating a signal representative of a sum of the first and second current levels; and a comparator having a first input terminal connected to an output terminal of the current sensor and a second input terminal connected to a reference signal; and a one-shot having an input terminal connected to an output terminal of the comparator and an output terminal connected to a second input terminal of the sequencer.

2. The commutation circuit of claim 1, wherein the rate of increase of the second current level is proportional to the inductance of the second winding.

3. The commutation circuit of claim 1 wherein the one-shot is for generating a series of pulses of equal duration, each of the pulses causing the sequencer to generate a signal to turn off the first current switch.

4. The commutation circuit of claim 1 further comprising a make-before-break circuit having an input terminal connected to the output terminal of the comparator and an output terminal connected to a third input terminal of the sequencer, the make-before-break circuit for signaling the sequencer when the second current level exceeds a threshold.

5. The commutation circuit of claim 4
wherein the make-before-break circuit causes the sequencer to control current flow through the first winding in response to the control signal and the signal generated by the current sensor before the second current level exceeds the threshold; and
wherein the make-before-break circuit causes the sequencer to control current flow through the second winding in response to the control signal and the signal generated by the current sensor after the second current level exceeds the threshold.

6. The commutation circuit of claim 5, wherein the make-before-break circuit further comprises a make-before-break generator having first and second terminals, the first terminal for receiving an FCOM pulse, the second terminal for receiving an end-make-before-break pulse developed when the second current level exceeds the threshold.

7. The commutation circuit of claim 5 wherein the make-before-break circuit further comprises an AND gate having a first input terminal connected to the output terminal of the comparator and a second input terminal connected to an output terminal of a blanking generator, an input terminal of the blanking generator being connected to the output terminal of the one-shot, the blanking generator being for generating a logical one during a pulse generated by the one-shot, a leading edge of the logical one occurring after a leading edge of the pulse generated by the one-shot and a trailing edge of the logical one occurring before a trailing edge of the pulse generated by the one-shot, the AND gate providing the end-make-before-break pulse.

8. A method for commutating an electric motor having first and second windings and first and second switches for controlling the flow of current through the first and second windings, respectively, the method comprising:
opening the first switch to allow a first current to flow through the first winding;
after the first current is flowing in the first winding opening the second switch to allow a second current to flow through the second winding, a level of the second current increasing gradually at least in part as a result of the inductance of the second winding;
detecting a sum of a level of the first current and a level of the second current;
turning the first switch off for a predetermined period of time when the sum of the level of the first current and the level of the second current exceeds a predetermined threshold level thereby reducing the sum of the level of the first current and the level of the second current to a value below the predetermined threshold level; and
turning the first switch off for the predetermined period of time when the sum of the level of the first current and the level of the second current again exceeds the predetermined threshold level.

9. The method of claim 8, further comprising turning the first switch off for a time period greater than the predetermined period of time when the second current exceeds the predetermined threshold level.

10. The method of claim 8, further comprising receiving a commutation signal and opening the second switch in response to the commutation signal.

* * * * *